(12) United States Patent
Singhal et al.

(10) Patent No.: US 11,842,153 B2
(45) Date of Patent: Dec. 12, 2023

(54) COMPUTING SYSTEM FOR AUTO-IDENTIFICATION OF SECONDARY INSIGHTS USING REVERSE EXTRACTION

(71) Applicant: Microsoft Technology Licensing, LLC, Redmond, WA (US)

(72) Inventors: Aman Singhal, Sammamish, WA (US); Deep Narayan Dubey, Kirkland, WA (US); Marcelo Medeiros De Barros, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 274 days.

(21) Appl. No.: 17/463,746

(22) Filed: Sep. 1, 2021

(65) Prior Publication Data

US 2023/0031412 A1 Feb. 2, 2023

Related U.S. Application Data

(60) Provisional application No. 63/226,364, filed on Jul. 28, 2021.

(51) Int. Cl.
| | |
|---|---|
| *G06F 40/279* | (2020.01) |
| *G06F 16/955* | (2019.01) |
| *G06F 16/2457* | (2019.01) |
| *G06F 16/901* | (2019.01) |
| *G06F 40/295* | (2020.01) |
| *G06F 40/30* | (2020.01) |
| *H04L 67/02* | (2022.01) |

(Continued)

(52) U.S. Cl.
CPC ...... *G06F 40/279* (2020.01); *G06F 16/24578* (2019.01); *G06F 16/9024* (2019.01); *G06F 16/9558* (2019.01); *G06F 16/9566* (2019.01); *G06F 40/295* (2020.01); *G06F 40/30* (2020.01); *G06F 3/04842* (2013.01); *G06V 30/416* (2022.01); *H04L 67/02* (2013.01)

(58) Field of Classification Search
CPC ............ G06F 40/279; G06F 16/24578; G06F 16/9024; G06F 16/9558; G06F 16/9566; G06F 40/295; G06F 40/30
See application file for complete search history.

(56) References Cited

U.S. PATENT DOCUMENTS 9,860,337 B1 * 1/2018 Brown .................... G06F 40/30
10,839,013 B1 * 11/2020 Werris ................. G06F 40/216
(Continued)

*Primary Examiner* — Asher D Kells
(74) *Attorney, Agent, or Firm* — CALFEE, HALTER & GRISWOLD LLP

(57) ABSTRACT

A computing system obtains a first article about a first topic, where the first article references a plurality of entities including a person. The computing system identifies the person as a dominant entity of the first article. The computing system determines whether the first article expresses negative sentiment based upon content of the first article. In accordance with a determination that the first article does not express negative sentiment, the computing system retrieves a uniform resource locator (URL) of a webpage about a second topic that is of interest to the first person. Upon receiving a request for the first article from a computing device, the computing system causes the first article and a link to be concurrently displayed on a display, where the URL of the webpage is embedded in the link.

20 Claims, 7 Drawing Sheets

(51) Int. Cl.
   *G06F 3/04842* (2022.01)
   *G06V 30/416* (2022.01)

(56) References Cited

U.S. PATENT DOCUMENTS

| | | | | |
|---|---|---|---|---|
| 2015/0317408 A1* | 11/2015 | Hong | .............. | G06F 16/86 |
| | | | | 707/798 |
| 2018/0082389 A1* | 3/2018 | Guggilla | .............. | G06N 20/00 |
| 2018/0285461 A1* | 10/2018 | Smith | .............. | G06F 16/3325 |
| 2018/0373701 A1* | 12/2018 | McAteer | .............. | G06F 16/9024 |
| 2020/0097601 A1* | 3/2020 | Han | .............. | G06F 16/36 |
| 2021/0042366 A1* | 2/2021 | Hicklin | .............. | G06Q 10/10 |
| 2021/0216716 A1* | 7/2021 | Wang | .............. | G06N 3/045 |

* cited by examiner

COMPUTING SYSTEM FOR AUTO-IDENTIFICATION OF SECONDARY INSIGHTS USING REVERSE EXTRACTION

RELATED APPLICATION

This application claims priority to U.S. Provisional Patent Application No. 63/226,364, filed on Jul. 28, 2021, and entitled "COMPUTING SYSTEM FOR AUTO-IDENTIFICATION OF SECONDARY INSIGHTS USING REVERSE EXTRACTION", the entirety of which is incorporated herein by reference.

BACKGROUND

A news application presents titles of articles to users on a display of a computing device. A title of the article is selected by a user and the article is then presented on the display. The user may select an article based upon an interest of the user in a person referenced in the article, such as when the person referenced in the article is a famous actor, politician, athlete, etc. When the user is particularly interested in the person and wishes to obtain additional information about the person that is not found in the article, the computing device receives input from the user that causes a search engine page to be opened on the computing device. The computing device receives a search query as input from the user and transmits the search query to the search engine. The computing device receives search results from the search engine that include the additional information about the person. The computing device presents the search results to the user.

SUMMARY

The following is a brief summary of subject matter that is described in greater detail herein. This summary is not intended to be limiting as to the scope of the claims.

Various technologies pertaining to identifying a topic that is of interest to a person referenced in an article (e.g., a secondary insight) are described herein. For example, some users visit news platforms to read articles about their favorite celebrities (e.g., television stars, politicians, authors, etc.). These users may also be interested in following interests of their favorite celebrities. As described herein, the discoverability of celebrity interests for users is improved by providing one or more links to webpages that include information about interests of a celebrity. When a link is selected, a webpage with information about an interest of a celebrity is presented to the user. In an example where an actor is interested in tennis or a tennis player, the webpage can be a vertical landing page for tennis or the tennis player. As discussed in detail below, the present disclosure describes generating secondary insights for any article using sentiment analysis along with dominant entity analysis and a knowledge graph built for insights.

In an example, a computing system determines a first topic (e.g., a person, place, thing, idea, or an event) that is of interest to a person (e.g., an actor) based upon an entry for the person in a knowledge graph and a first article that references both the first topic and the person. When a request for a second article about a second topic is received from a computing device, the computing system determines whether the person is a dominant entity in the second article and whether the second article expresses non-negative sentiment. When the person is a dominant entity and when the second article expresses non-negative sentiment, the computing system causes the second article and a link to be presented on a display. When the link is selected, a webpage that includes information about the first topic is presented on the display.

In another example, a computing system executes a search over a knowledge graph based upon an identifier for a profession (e.g., actor). The search produces search results, where the search results include an entry in the knowledge graph for a person that belongs to the profession (e.g., the person is an actor). The computing system determines a name of the person based upon the entry for the person in the knowledge graph. The computing system retrieves (e.g., identifies) a plurality of articles (e.g., news articles) based upon the name of the person. The computing system determines a first topic (e.g., a sports team) that is of interest to the person based upon content of at least one of the plurality of articles. The computing system retrieves a uniform resource locator (URL) of a webpage that includes information about the first topic and stores the URL, a name of the person, and a name of the first topic in computer-readable storage.

The computing system obtains an article (e.g., a news article), where the article references a plurality of entities including the person, and where the article is about a second topic. The computing system determines that the person is a dominant entity of the article based upon a number of references to the person within the article. The computing system determines whether the article expresses non-negative sentiment based upon content of the article. When the article expresses non-negative sentiment (e.g. positive sentiment or neutral sentiment), the computing system retrieves the URL of the webpage that includes information about the first topic that is of interest to the person based upon the name of the person in the article. Upon receiving a request for the article from a computing device, the computing system causes the article and a link to be presented concurrently on a display, where the URL is embedded within the link. According to embodiments, the link is in the form of a question that includes the name of the person and the name of the first topic. When the link is selected, the webpage that includes information about the first topic is presented on the display.

The above-described technologies present various advantages over conventional technologies for discovering information about interests of a person. First, by leveraging information within a knowledge graph, the above-described technologies enable interests of a wide variety of people of varying professions to be discovered. Second, the above-described technologies ensure that a link with additional information about an interest of a person is inserted into an article when the article is primarily directed towards the person (e.g., the person is the dominant entity of the article). This can save user time and effort and can save computing and network resources by avoiding search engine procedures. Third, via sentiment analysis, the above-described technologies ensure that a link with additional information about a person is not inserted into an article in an inappropriate circumstance, such as when the article pertains to a tragic event. Fourth, unlike conventional technologies, the above-described technologies do not require a user to utilize a search engine in order for the user to discover information about a person that interests the user. Fifth, by obtaining names of persons via the knowledge graph, the above-described technologies avoid crawling web pages and/or searching a web index to obtain such information. This saves both computing and network resources.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Figure 1:
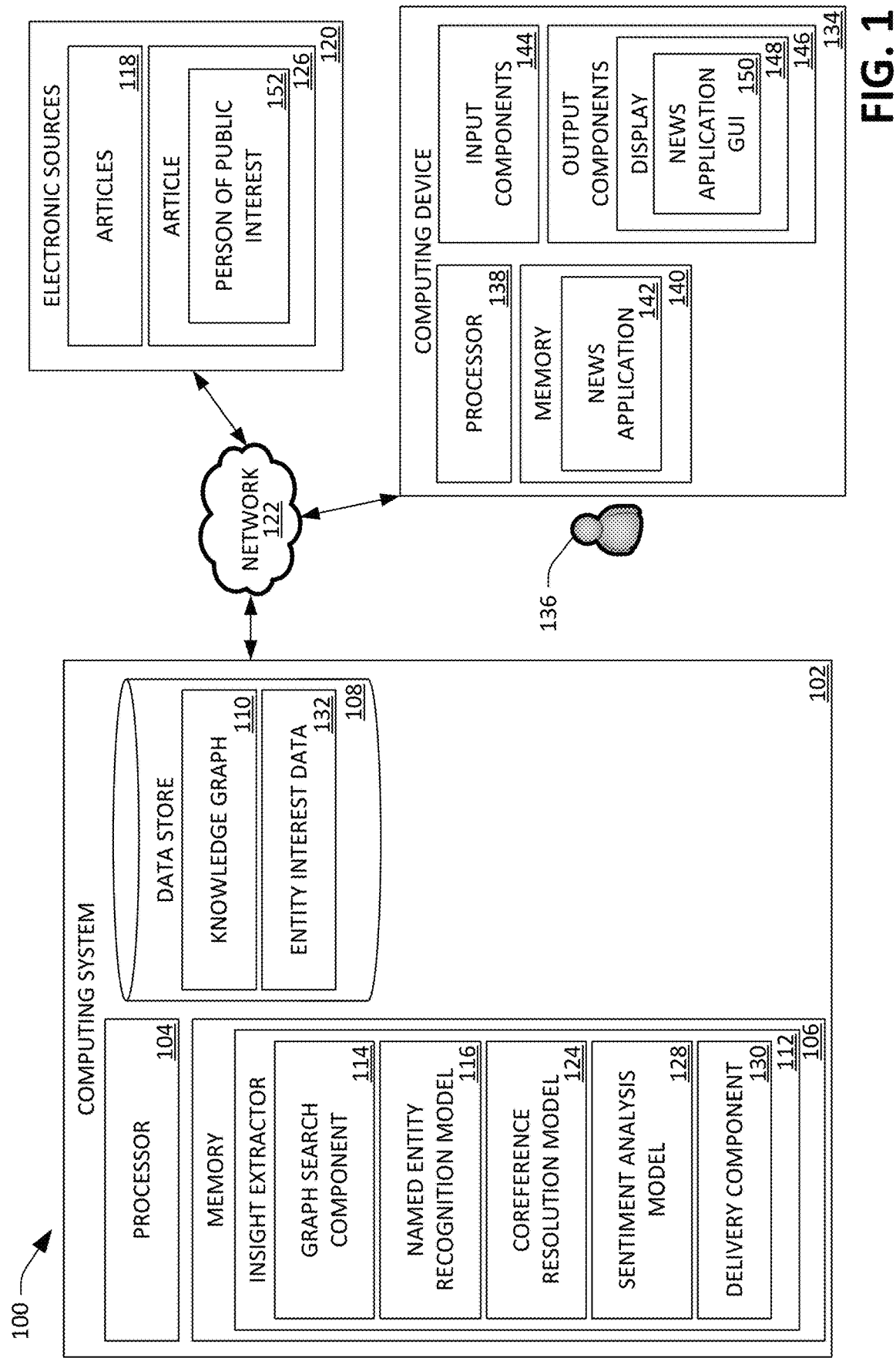
FIG. 1 is a functional block diagram of an example computing environment that facilitates automatic identification of a topic that is of interest to a person referenced in an article.

Various technologies pertaining to automatic identification of a topic that is of interest to a person referenced in an article are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, an article may be selected by a user for viewing based upon an interest of the user in a subject of the article. In an example, the subject of the article may be a politician and the user may wish to view additional information about the politician beyond what is presented in the article, such as which sports teams the politician supports, which bands the politician likes, and so forth. Conventional approaches to presenting additional information pertaining to a person referenced in an article rely upon search engine searches initiated by a computing device operated by the user. As such, conventional approaches reduce user engagement with a news application presenting the article.

To facilitate presentation of information about a person that a user is interested in, a computing system executes a search over a knowledge graph based upon an identifier for a profession (e.g., politician). The search produces search results, where the search results include an entry in the knowledge graph for a person that belongs to the profession (e.g., the person is a politician). The computing system determines a name of the person based upon the entry in the knowledge graph. The computing system retrieves a plurality of articles (e.g., news articles) based upon the name of the person. The computing system determines, via a named entity recognition model, a topic (e.g., a television show) that is of interest to the person based upon content of at least one of the plurality of articles. The computing system retrieves a uniform resource locator (URL) of a webpage that includes information about the topic and stores the URL, a name of the person, and a name of the topic in computer-readable storage. In an example where the topic is a television show, the webpage is an entry in an online encyclopedia for the television show or an official webpage of the television show.

The computing system obtains a computer-readable article, where the article references a plurality of entities including the person. It is contemplated that the article may be about a topic that is different than a topic of the at least one of the plurality of news articles. The computing system determines, via a coreference resolution model, that the person is a dominant entity of the article based upon a number of references to the person within the article. The computing system determines, via a sentiment analysis model, whether the article expresses non-negative sentiment based upon content of the article. When the article expresses non-negative sentiment (and when the person is a dominant entity of the article), the computing system retrieves the URL for the webpage that includes information about a topic that is of interest to the person based upon the name of the person in the article. Upon receiving a request for the article from a computing device, the computing system causes the article and a link to be presented concurrently on a display, where the URL is embedded within the link. According to embodiments, the link is in the form of a question. In a specific example where the person is "Politician X" and the topic of interest to "Politician X" is "TV Show Y", the link displayed on the display is "Did you know that Politician X loves TV show Y?" When the link is selected, the webpage that includes information about the topic of interest to the person is retrieved and presented on the display.

The above-described technologies present various advantages over conventional technologies for discovering information about interests of a person. First, by leveraging information within a knowledge graph, the above-described technologies enable interests of a wide variety of people of varying professions to be discovered. Second, the above-described technologies ensure that a link with additional information about an interest of a person is inserted into an article when the article is primarily directed towards the person (e.g., the person is the dominant entity of the article). This can save user time and effort and can save computing and network resources by avoiding search engine procedures. Third, via sentiment analysis, the above-described technologies ensure that a link with additional information about a person is not inserted into an article in an inappropriate circumstance, such as when the article pertains to a tragic event. Fourth, unlike conventional technologies, the above-described technologies do not require a user to utilize a search engine in order for the user to discover information about a person that interests the user. Fifth, by obtaining names of persons via the knowledge graph, the above-described technologies avoid crawling web pages and/or searching a web index to obtain such information. This saves both computing and network resources.

With reference to FIG. 1, an example computing environment 100 that facilitates automatic identification of a topic that is of interest to a person referenced in an article is illustrated. The computing environment 100 includes a computing system 102. The computing system 102 includes a processor 104, memory 106, and a data store 108. The data store 108 stores a computer-implemented knowledge graph 110. According to embodiments, the computing system 102 is a cloud-based computing platform that is distributed across multiple computing devices.

The knowledge graph 110 includes nodes and edges connecting the nodes, where the nodes represent entities (e.g., people, places, things, ideas, events, organizations, etc.) or attributes of the entities and where the edges are indicative of relationships between the entities themselves or relationships between the entities and the attributes. In an example, a first node in the knowledge graph 110 represents a person who is an athlete, a second node in the knowledge graph 110 represents a sports team, and a first edge in the knowledge graph 110 that connects the first node and the second node is assigned criteria that indicates that the person plays for the sports team. In another example, a third node in the knowledge graph 110 represents a profession (e.g., athlete), and the first node is connected to the third node in the knowledge graph 110 via a second edge that is assigned criteria that indicates that the person is an athlete. Nodes in the knowledge graph 110 that represent entities include names of the entities. Nodes in the knowledge graph 110 that represent entities may be assigned unique identifiers so as to disambiguate entities that share the same name. According to some embodiments, nodes and/or edges within the knowledge graph 110 comprise metadata that enables information about the entities to be retrieved. According to some embodiments, nodes and/or edges within the knowledge graph 110 store information about the entities. According to embodiments, an entry for an entity in the knowledge graph 110 is represented by a node for the entity in the knowledge graph 110 and nodes (representing other entities and/or attributes) that are connected to the node via (one or more) edges. According to embodiments, nodes and/or edges within the knowledge graph 110 have confidence values assigned thereto. In an example, a first node representing a person is connected to a second node representing a profession via an edge in the knowledge graph 110. The second node and/or the second edge has a confidence value assigned thereto, where the confidence value is indicative of a certainty that the person belongs to the profession.

Figure 2:
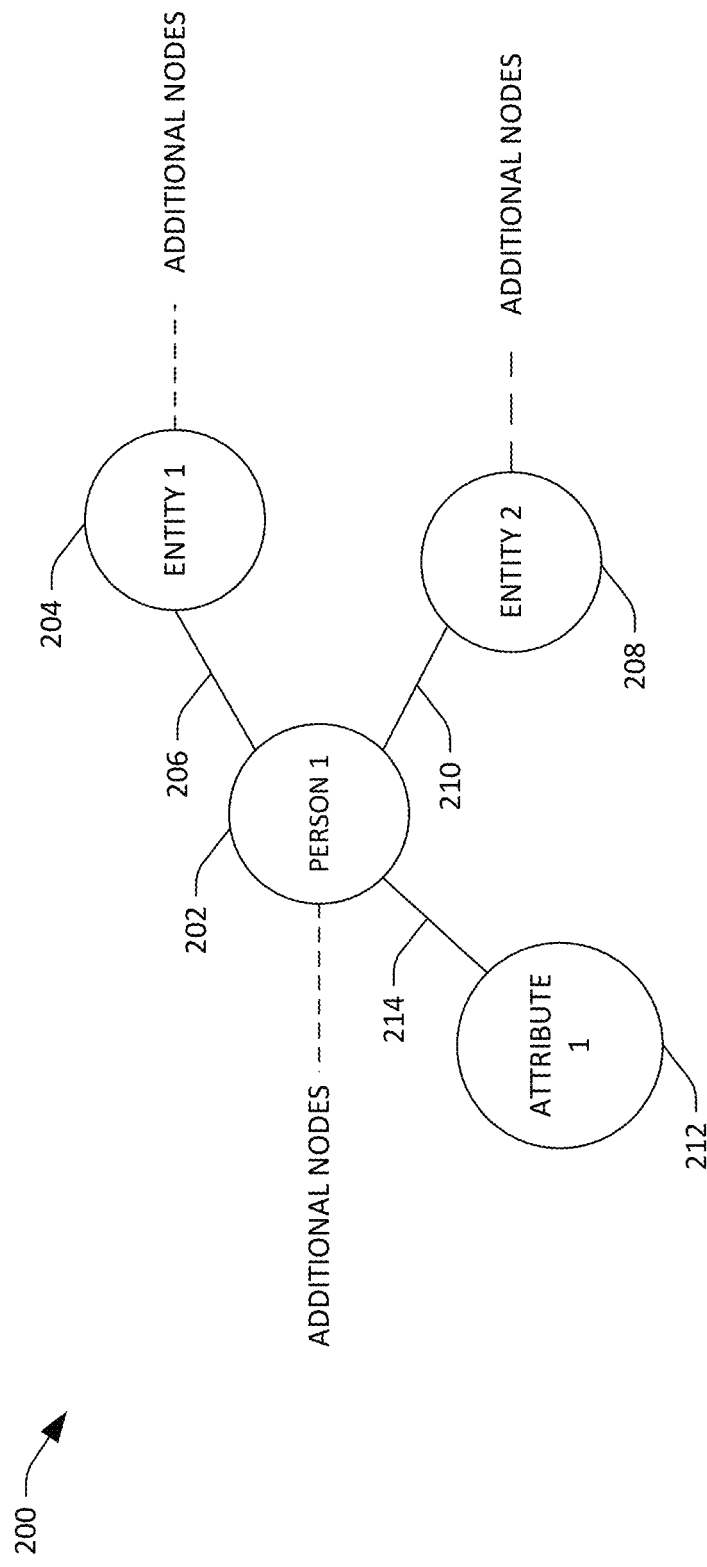
FIG. 2 is a symbolic depiction of an example knowledge graph.

Turning now to FIG. 2, a symbolic depiction of an example knowledge graph 200 is illustrated. The knowledge graph 200 may be or include the knowledge graph 110 or the knowledge graph 110 may be or include the knowledge graph 200. The knowledge graph 200 includes a first node 202 that represents a first person. The first person may be a person of public interest (e.g., a celebrity). According to examples, the first person is an actor, a politician, an athlete, a musician, etc. The knowledge graph 200 includes a second node 204 that represents a first entity, where the second node 204 is connected to the first node 202 by a first edge 206, where the first edge 206 is assigned criteria that is indicative of a relationship between the first person and the first entity. In an example where the first person is a politician, the second node 204 represents a political party and the first edge 206 is assigned criteria indicating that the first person belongs to the political party. The knowledge graph 200 includes a third node 208 that represents a second entity, where the third node 208 is connected to the first node 202 by a second edge 210, and where the second edge 210 is assigned criteria that is indicative of a relationship between the first person and the second entity. Following the example given above, the third node 208 represents a spouse of the first person and the second edge 210 is assigned criteria indicating that the first person is married to the spouse. The knowledge graph 200 includes a fourth node 212 that represents a first attribute, where the fourth node 212 is connected to the first node 202 by a third edge 214, and where the third edge 214 is assigned criteria indicating that the first person has the first attribute. Example attributes include profession, popularity, age, weight, place of residence, etc. Following the example given above, the first attribute is "politician" (e.g., the first person is a politician). It is to be understood that the knowledge graph 200 may include additional nodes and edges (not depicted in FIG. 2).

Turning back to FIG. 1, the memory 106 of the computing system 102 includes an insight extractor application 112 (also referred to as "the insight extractor 112") loaded therein. As will be described in greater detail below, the insight extractor 112 is configured to (1) determine one or more topics of interest of a person, (2) store information pertaining to the one or more topics of interest of the person in computer-readable storage, and (3) cause the information pertaining to the one or more topics of interest of the person to be presented to users.

The insight extractor 112 includes a graph search component 114. The graph search component 114 is configured to search the knowledge graph 110 based upon search criteria. In an example, the search criteria is a type of profession, such as actor, athlete, musician, politician, social media influencer, etc. As such, the graph search component 114 generates search results upon searching the knowledge graph 110, where the search results include names of persons referenced in the knowledge graph 110 who belong to the profession. In another example, the search criteria is an attribute. In an example, the graph search component 114 identifies persons that are social media influencers.

The insight extractor 112 further includes a named entity recognition model 116. The named entity recognition model 116 is configured to identify entities referenced in a plurality of articles 118 (e.g. news articles) and relationships between the entities based upon content (e.g., text) of the plurality of articles 118. The named entity recognition model 116 determines topics that are of interest to persons based upon the relationships. The named entity recognition model 116 receives the plurality of articles 118 from a plurality of electronic sources 120 over a network 122 (e.g., the Internet, intranet, etc.) In an example, the named entity recognition model 116 identifies a person referenced in an article (from the plurality of articles 118), an entity referenced in the article, and an interest relationship between the person and the entity, that is, the person is interested in the entity. The entity that is of interest to the person may be another person, an organization, a place, a type of media, an idea, an event, or a thing. The entity that is of interest to the person is a topic of interest of the person. Topics of interest to the person may include one or more of an athlete, a sports team, a sports league, a sports event, an entertainment event, a performer, an actor, a television show, a director, a video game, a politician, or a political party.

According to embodiments, the named entity recognition model 116 is or includes a deep learning model. The deep learning model includes an input layer, one or more hidden layers, and an output layer, where the layers comprise nodes, where the nodes within a layer are connected to nodes within a different layer by edges that have learned weights assigned thereto, and where the weights are influenced by content of a second plurality of articles (not depicted in FIG. 1) that are used to train the deep learning model. According to embodiments, the second plurality of articles include references to different people expressing interest in different entities (e.g., topics), and such articles are used as positive training examples in training the deep learning model.

The insight extractor 112 further includes a coreference resolution model 124. The coreference resolution model 124 is configured to determine a dominant entity (from amongst a plurality of entities) referenced in an article 126 based upon a number of references to the entity (e.g., a person, such as a celebrity) in the article 126. The references to the entity may include one or more of a full name of the entity, a first name of the entity (when the entity is a person), a last name of the entity (when the entity is a person), a subject pronoun referring to the entity, an object pronoun referring to the entity, a possessive adjective referring to the entity, a possessive pronoun referring to the entity, or a reflexive pronoun referring to the person. In an example where the article 126 includes the sentence "Jane said she would go to the store.", the coreference resolution model 124 identifies two references to Jane: "Jane" and "she". According to embodiments, the dominant entity referenced in the article 126 is an entity with a greatest number of references within the article 126. According to some embodiments, the dominant entity referenced in the article 126 is an entity with a greatest number of references within the article 126 that has a particular type (e.g., a person that is referred to a greatest number of times within the article 126 in comparison to other persons referred to in the article 126). According to embodiments, the coreference resolution model 124 may be or include a rule-based model, a mention-pair model, a mention-ranking model, or a clustering-based model.

The insight extractor 112 further includes a sentiment analysis model 128. The sentiment analysis model 128 is configured to determine whether the article 126 expresses non-negative sentiment (e.g., positive sentiment or neutral sentiment) based upon content of the article 126. According to some embodiments, the sentiment analysis model 128 classifies the article 126 as positive or negative based upon content of the article 126. In an example, the sentiment analysis model 128 classifies the sentence "Actor John Doe's new movie is a huge hit" as positive and the sentence "Actor John Doe was arrested yesterday" as negative. According to other embodiments, the sentiment analysis model 128 classifies the article 126 as positive, neutral, or negative based upon content of the article 126. According to some embodiments, the sentiment analysis model 128 is a deep learning model that outputs, based upon content of an input article, a value that ranges from 0.0 to 1.0, where a value of 0.0 indicates that the input article expresses negative sentiment and where a value of 1.0 indicates that the input article expresses positive sentiment. The deep learning model includes an input layer, a plurality of hidden layers, and an output layer, where the layers comprise nodes, where the nodes within a layer are connected to nodes within a different layer by edges that have learned weights assigned thereto, where the learned weights are influenced by content of a third plurality of articles (not shown in FIG. 1).

The sentiment analysis model 128 may utilize knowledge-based techniques, statistical methods, or a combination thereof in order to determine whether the article 126 expresses a non-negative sentiment. The knowledge-based techniques classify the article 126 as positive or negative based upon presence of words such as "happy", "sad", etc. Statistical methods used by the sentiment analysis model 128 may include latent semantic analysis, support vector machines, bag of words, and deep learning models.

The insight extractor 112 may further include a delivery component 130. The delivery component 130 is configured to transmit the article 126 (as well as other articles) to different computing devices operated by different users, where the article 126 may include a link to a webpage that includes information about a topic that is of interest to a person referenced in the article 126.

The data store 108 may further store entity interest data 132 for a plurality of persons that are referenced in the knowledge graph 110, where the entity interest data 132 for a person includes a name of the person, a name of a topic of interest to the person, and a URL of a webpage that includes information pertaining to the topic that is of interest to the person. In an example, the webpage may be an entry in an online encyclopedia for the topic. In another example, the webpage may be an official webpage of the topic. In yet another example, the webpage may be a webpage for the topic that is provided by a news aggregator. In a further example, the webpage may include URLs for webpages, where each webpage in the webpage references both the person and the topic that is of interest to the person. In yet another example, the webpage includes information about the topic and URLs for different webpages, where some of the URLs are for webpages that discuss both the topic and the person in relation to one another and where some of the URLs are for webpages that include additional information about the topic (beyond the information included in the webpage).

The computing environment 100 further includes a computing device 134 that is operated by a user 136. The computing device 134 is in communication with the computing system 102 by way of the network 122. In an example, the computing device 134 is a desktop computing device, a laptop computing device, a tablet computing device, a smartphone, a gaming console, or a wearable computing device.

The computing device 134 includes a processor 138 and memory 140, where the memory 140 has a news application 142 loaded therein. The news application 142 is configured to present news articles to the user 136 (e.g., the article 126). The computing device 134 further includes input components 144 that enable the user 136 to set forth input to the computing device 134. The input components 144 may include a mouse, a keyboard, a trackpad, a scroll wheel, a touchscreen, a camera, a video camera, a microphone, etc. The computing device 134 also includes output components 146 that enable the computing device 134 to output information to the user 136. The output components 146 include a display 148, where graphical features may be presented thereon. The news application 142 presents a news application graphical user interface (GUI) 150 (also referred to herein as "the GUI 150") on the display 148. The output components 146 may also include a speaker and/or a haptic feedback device (not shown in FIG. 1).

Although the graph search component 114, the named entity recognition model 116, the coreference resolution model 124, the sentiment analysis model 128, and the delivery component 130 are described above as being part of the insight extractor 112, it is to be understood that some or all of these components/models may be separate applications and that some or all of these components/models may execute on separate computing devices.

Operation of the computing environment 100 is now set forth. It is contemplated that the article 126 includes a reference to a person 152 of public interest (e.g., a celebrity, such as an actor or a politician). It is further contemplated that at least one article in the plurality of articles 118 also includes a reference to the person 152. It is also contemplated that the knowledge graph 110 includes an entry for the person 152.

The graph search component 114 of the insight extractor 112 executes a search over the knowledge graph 110 based upon an identifier for a profession (e.g., actor, politician, etc.). The search produces search results that include entries for persons in the knowledge graph 110 that belong to the profession. The graph search component 114 identifies an entry for the person 152 in the search results. The graph search component 114 obtains a name of the person 152 from the entry for the person 152 in the knowledge graph 110. In an example, the name of the person 152 is "John Doe" and the profession of "John Doe" is actor.

The insight extractor 112 selects the person 152 from amongst the persons. According to embodiments, the insight extractor 112 selects the person 152 when a confidence value assigned to a node in the knowledge graph 110 representing a profession of the person 152 exceeds a threshold value. The insight extractor 112 obtains the plurality of articles 118 from the plurality of electronic sources 120, where at least one of the plurality of articles 118 (1) references the person 152 and (2) references a topic that is of interest to the person 152. In an example, the insight extractor 112 transmits a search query to a search engine (not shown in FIG. 1), where the search query includes the name of the person 152. The search engine returns search results to the insight extractor 112, where the search results include URLs of the plurality of articles 118. The insight extractor 112 may then access one or more of the plurality of articles 118 using the URLs. According to embodiments, the insight extractor 112 disregards articles that have dates of publication that are beyond a threshold period of time. In an example, the insight extractor 112 accesses articles that are dated within five years of a current date.

The insight extractor 112 provides content of at least one of the plurality of articles 118 to the named entity recognition model 116. The named entity recognition model 116 identifies a topic that is of interest to the person 152 based upon the content of the at least one of the plurality of articles 118. In an example, the insight extractor 112 provides text of the at least one article to the named entity recognition model 116. The named entity recognition model 116: (1) identifies the person 152 referenced in the at least one article, (2) identifies other entities referenced in the article, and (3) identifies relationships between the person 152 and the other entities. It is contemplated that the relationships include "interest" relationships, that is, that certain entities referenced in the at least one article are of interest to the person 152. The entities that are of interest to the person 152 are topics of interest of the person 152. As such, the named entity recognition model 116 identifies the topic that is of interest to the person 152 based upon the content of the at least one article, where the content of the at least one news article includes a name of the person 152 and a name of the topic. According to examples, the topic that is of interest to the person 152 is another person, such as an athlete, an actor, a politician, a musician, a director, a social media influencer, an author, etc., an organization, such as a political party, a sports team, a band, etc., a place, such as a city or a country, a type of media, such as a particular movie or television show, an idea, such as a particular hobby of the person 152, or a thing.

In an example where the person 152 is named "John Doe", the at least one article includes the sentence "Actor John Doe often attends Basketball Team X's games." Following the example, the named entity recognition model 116 identifies an interest relationship between "John Doe" and "Basketball Team X," that is, "Basketball Team X" is a topic of interest to "John Doe." The insight extractor 112 may identify topics of interest for different persons belonging to the profession (as well as topics of interest for persons belonging to other professions) using the above-described processes. It is contemplated that the insight extractor 112 periodically (e.g., once a day, once a week, once a year, etc.) repeats the steps of searching the knowledge graph 110 and identifying topics of interest to the person 152.

Subsequent to identifying the topic that is of interest to the person 152, the insight extractor 112 retrieves a URL of a webpage that includes information pertaining to the topic that is of interest to the person 152. In one example, the URL is an entry for the topic in an online encyclopedia. In another example, the URL is an official webpage of the topic. In yet another example, the URL is a current news article pertaining to the topic. Following the specific example given above where the person 152 is "John Doe" and where the topic of interest to "John Doe" is "Basketball Team X", the URL is an entry for "Basketball Team X" in an online encyclopedia. The insight extractor 112 stores the following information as part of the entity interest data 132 in the data store 108: a name of the person 152, a name of the topic that is of interest to the person 152, and one or more URLs of webpages that include information pertaining to the topic that is of interest to the person 152. The insight extractor 112 may also store, as part of the entity interest data 132, a date in which the topic that is of interest to the person 152 was determined. According to embodiments, the insight extractor 112 may modify the knowledge graph 110 to reflect the interest of the person 152 in the topic. In an example, the insight extractor 112 may cause an edge to be added to the knowledge graph 110, where the edge connects a node representing the person 152 within the knowledge graph 110 and a node representing the topic within the knowledge graph 110, where the node is assigned criteria indicating that the entity is of interest to the person 152.

According to embodiments, the insight extractor 112 updates topics of interest to the person 152 over time. In an example, via the above-described processes, the insight extractor 112 determines that the person 152 is a fan of "Basketball Team X" using articles that are dated within a first period of time and stores the interest of the person 152 in "Basketball Team X" as part of the entity interest data 132. Sometime thereafter, the person 152 switches their support to "Basketball Team Y." The insight extractor 112, via the above-described processes, determines that the person 152 is a fan of "Basketball Team Y" using articles that are dated within a second period of time that occurs after the first period of time. The insight extractor 112 updates the entity interest data 132 for the person 152 to replace the interest of the person in "Basketball Team X" with "Basketball Team Y."

The insight extractor 112 receives the article 126 from an electronic source in the plurality of electronic sources 120. The article 126 may be a recently published news article. The article 126 may be about a first topic. The article 126 references a plurality of entities (e.g., persons, places, things, ideas, events, etc.), where the plurality of entities include the person 152. It is contemplated that the plurality of entities referenced in the article 126 do not include an entity corresponding to a second topic, where the second topic is of interest to the person 152 (determined via the named entity recognition model 116). The insight extractor 112 provides content of the article 126 to the coreference resolution model 124. The coreference resolution model 124 determines that the person 152 is a dominant entity of the article 126 based upon a number of references to the person 152 within the article 126. The person 152 may be a dominant entity of the article 126 when the person is a primary subject of the article 126. In this manner, the coreference resolution model 124 ensures that the reference to the person 152 in the article 126 is not a tangential reference and that the article 126 is primarily directed towards the person 152. Following the example given above where the person 152 is an actor named "John Doe", the coreference resolution model 124 determines that "John Doe" is a dominant entity of the article 126 when the article 126 is an interview with "John Doe."

The insight extractor 112 provides content of the article 126 to the sentiment analysis model 128 and the sentiment analysis model 128 outputs an indication as to whether the article 126 expresses a non-negative sentiment based upon the content of the article 126. When the article 126 expresses a non-negative sentiment (and when the person 152 is the dominant entity of the article 126), the insight extractor 112 executes a search over the entity interest data 132 based upon the name of the person 152 referenced in the article 126. The search produces search results, where the search results include a URL of a webpage that includes information pertaining to the (second) topic that is of interest to the person 152. Following the example given above where the person 152 is an actor named "John Doe" and where the (second) topic of interest to "John Doe" is "Basketball Team X", the search results include a URL of a webpage that includes information about "Basketball Team X."

Upon receiving a request for the article 126 from the news application 142 (or upon receiving a request from another application executing on the computing device 134) and when the article 126 is determined to express non-negative sentiment and when the person 152 is the dominant entity of the article 126, the delivery component 130 of the insight extractor 112 transmits the article 126 and a link to the news application 142 (or another application executing on the computing device 134), where the URL of the webpage that includes information pertaining to the (second) topic of interest to the person 152 is embedded within the link. According to some embodiments, the delivery component 130 inserts the link into the article 126. According to other embodiments, the delivery component 130 transmits the article 126 and the link to the news application 142, where the article 126 is displayed in a region of the GUI 150 reserved for news articles and where the link is displayed in a region of the GUI 150 that is reserved for non-news article data. According to embodiments, the link is in the form of a question that includes the name of the person 152 and the name of the (second) topic that is of interest to the person 152. Following the example given above where the person 152 is an actor named "John Doe" and where the entity of interest is "Basketball Team X", the link is in the form of "Did you know that John Doe is a huge fan of Basketball Team X?" The news application 142 presents the article 126 and the link on the display 148. When the link is selected by the user 136, the computing device 134 retrieves the webpage corresponding to the URL embedded in the link and the computing device 134 presents the webpage on the display 148. The user 136 may then view the information about the (second) topic that is of interest to the person 152. When the article 126 is determined to express negative sentiment (or when the person 152 is not the dominant entity of the article 126), the delivery component 130 transmits the article 126 (without the link) to the news application 142, where the article 126 is presented on the display 148. In this manner, the insight extractor 112 ensures that links to webpages including information about a topic of interest of the person 152 are not presented in inappropriate circumstances.

According to embodiments, the insight extractor 112 determines that the person 152 is included in a plurality of persons based upon a name of the person in the article 126. The article 126 (about the first topic) and the link to the webpage that includes information pertaining to the (second) topic are displayed in accordance with the person 152 being included in the plurality of persons.

According to embodiments, the insight extractor 112 obtains a name of the person 152 from the article 126. The insight extractor 112, via the graph search component 114, executes a search over the knowledge graph 110 based upon the name of the person 152. The insight extractor 112 identifies a profession of the person 152 from an entry for the person 152 in the knowledge graph 110. The insight extractor 112 determines that the profession of the person 152 is included in a plurality of professions (e.g., actor, politician, etc.). The article 126 (about the first topic) and the link to the webpage that includes information pertaining to the (second) topic are displayed in accordance with the person 152 being included in the plurality of professions.

It is to be understood that the insight extractor 112 may identify different topics of interest of the person 152 and that the insight extractor 112 may store information pertaining to the different topics in the entity interest data 132. In an example, the insight extractor 112 identifies a first topic and a second topic that are of interest to the person 152 using the above-described processes. Following the example, the insight extractor 112 obtains a first URL of a first webpage that includes information about the first topic and a second URL of a second webpage that includes information about the second topic. According to some embodiments, the insight extractor 112 assigns rankings to the first topic and the second topic based upon ranking criteria. The ranking criteria may include user data of the user 136, popularity of the first topic and the second topic as determined by a number of times each of the first webpage and the second webpage were accessed, a number of articles that exist on the web about the first topic and a number of articles that exist on the web about the second topic, a number of articles that exist on the web that reference the person 152 with respect to the first topic and a number of articles that exist on the web that reference the person 152 with respect to the second topic, manually set forth relevance scores, and so forth. According to embodiments, the insight extractor 112 selects one of the first topic or the second topic based upon the rankings assigned to the first topic and the second topic and causes a link with one of the first URL or the second URL embedded therein to be presented on the display 148. According to other embodiments, the insight extractor 112 may cause both a first link (which has the first URL embedded therein) and the second link (which has the second URL embedded therein) to be presented on the display 148.

Figure 3:
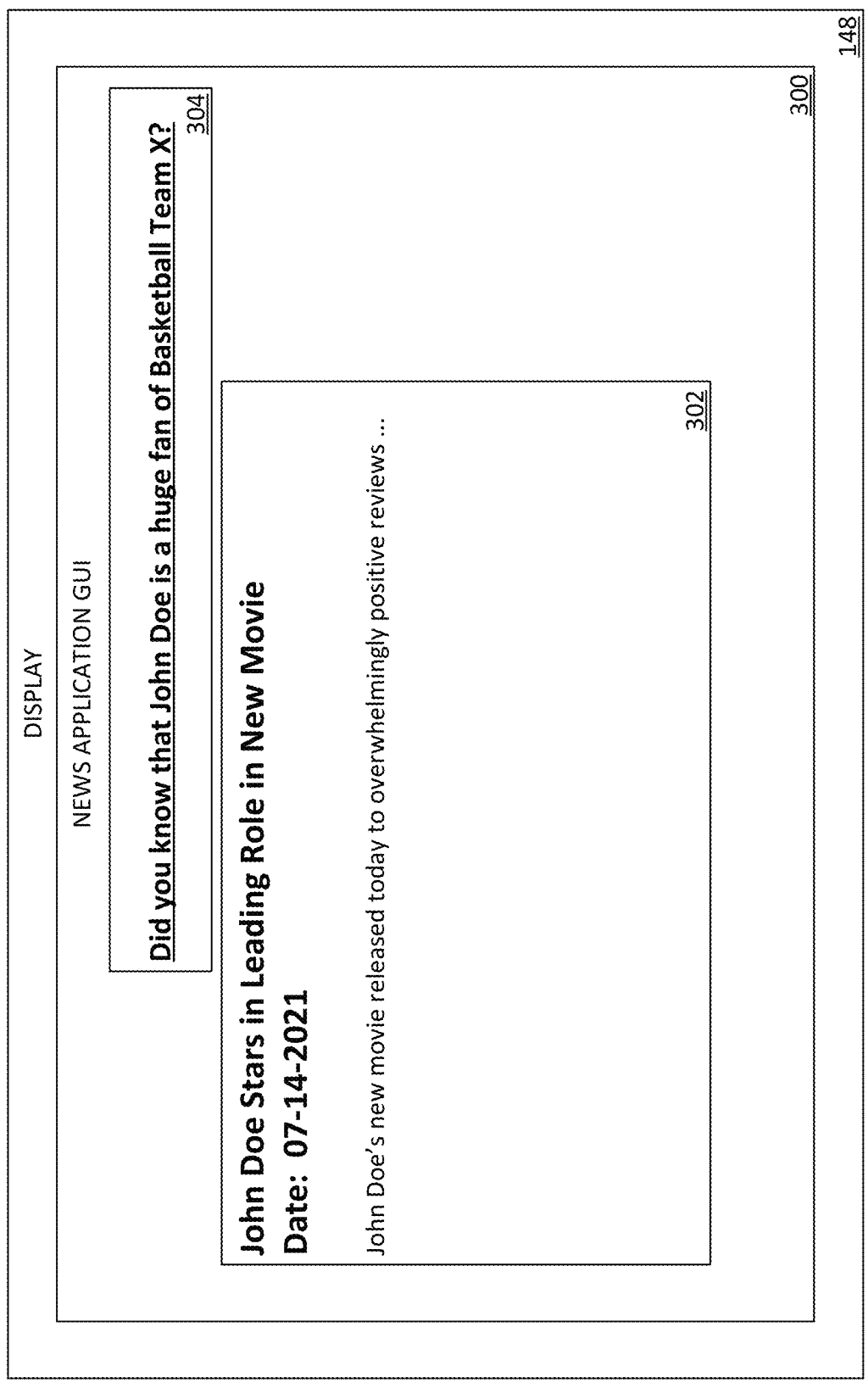
FIG. 3 is an example graphical user interface (GUI) of a news application.

Turning now to FIG. 3, an example GUI 300 of the news application 142 is illustrated. The GUI 300 is presented on the display 148 of the computing device 134. The GUI 300 may be or include the GUI 150 or the GUI 150 may be or include the GUI 300. The GUI 300 includes a first region 302 that displays the article 126. It is contemplated that the article may be about a first topic. The GUI 300 also includes a second region 304 that displays the link. In the example shown in FIG. 3, the link is in the form of a question that references the person 152 ("John Doe") and a second topic ("Basketball Team X") that is of interest to the person 152, where the second topic is different than the first topic. In the example depicted in FIG. 3, the (first) topic of the news article 126 is "John Doe" starring in a new movie, whereas the (second) topic of interest to "John" Doe" is "Basketball Team X." The URL of the webpage that includes information about the (second) topic that is of interest to the person 152 is embedded within the link. When the link is selected, the computing device 134 accesses the webpage using the URL and presents the webpage on the display 148.

Although not depicted in FIG. 3, it is to be understood that more than one link may be presented within the GUI 300. In an example, the GUI 300 includes a first link to a first topic of interest of the person 152 and a second link to a second topic of interest of the person 152. When the first link is selected, a webpage about the first topic is presented on the display 148. When the second link is selected, a webpage about the second topic is presented on the display 148. In a specific example, the first topic of interest to the person 152 is a music festival and the second topic of interest to the person 152 is an entertainer.

Figure 4:
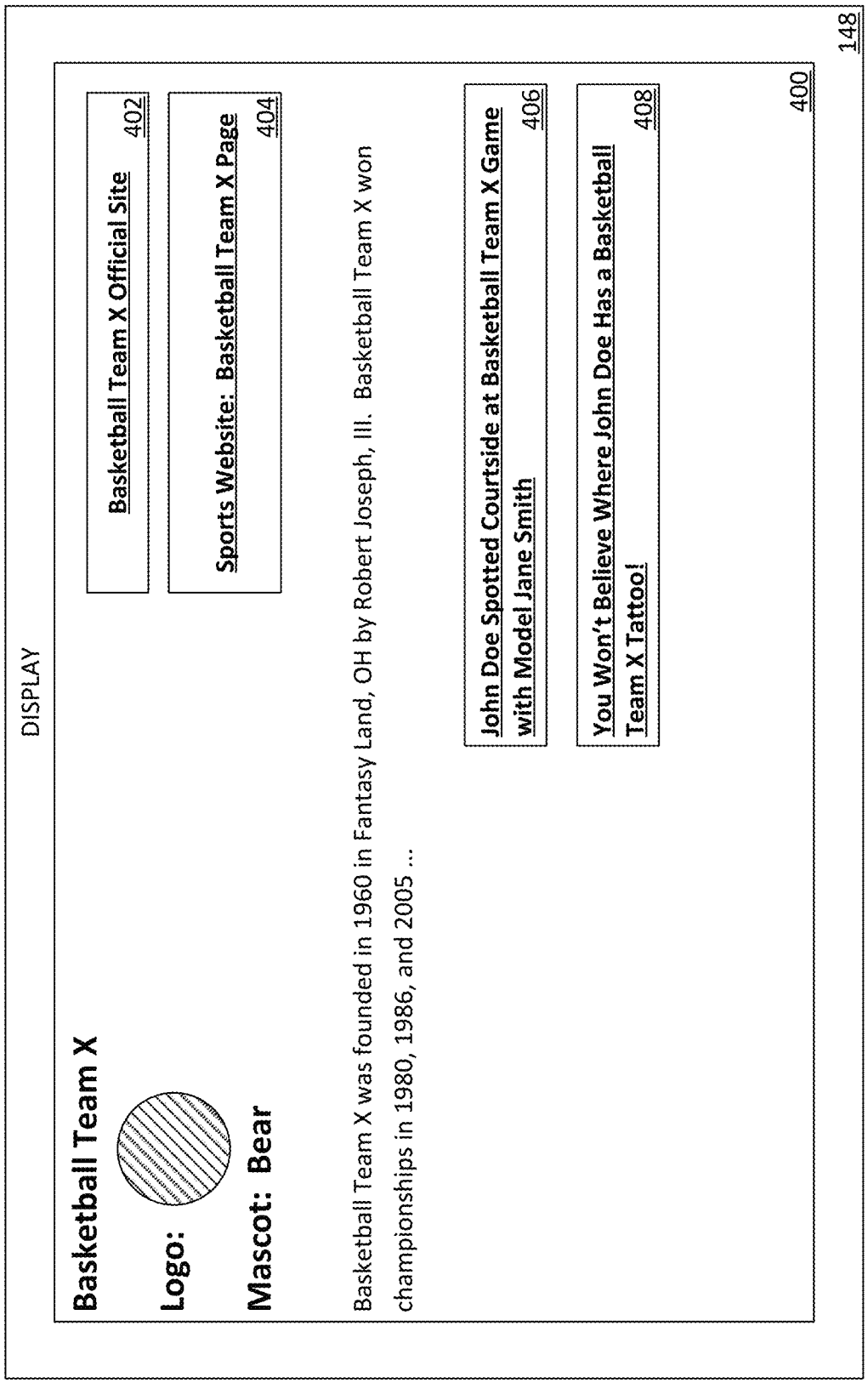
FIG. 4 is an example webpage that includes information about a topic that is of interest to a person.

Referring now to FIG. 4, an example webpage 400 that includes information pertaining to a topic of interest to the person 152 is depicted. As "John Doe" is interested in "Basketball Team X," the webpage 400 includes information about "Basketball Team X." According to some embodiments, the webpage 400 includes one or more links to articles about the topic of interest to the person 152. According to some embodiments, the webpage 400 includes one or more links to articles that reference both the person 152 ("John Doe") and the topic of interest ("Basketball Team X"). According to some embodiments, articles that are linked to in the webpage 400 are selected based on how recent each of the articles were published.

The webpage 400 additionally includes a first link 402 to an official webpage of "Basketball Team X". When the first link 402 is selected, the official webpage of "Basketball Team X" is presented on the display 148. The webpage 400 further includes a second link 404 to a webpage of "Basketball Team X" on a sports website. When the second link 404 is selected, the webpage of "Basketball Team X" on the sports website is presented on the display 148. The webpage 400 also includes a third link 406 to a webpage discussing "John Doe" being spotted sitting courtside at a "Basketball Team X" game with a model named "Jane Smith." When the third link 406 is selected, the webpage discussing "John Doe" being spotted courtside at a "Basketball Team X" game with model "Jane Smith" is presented on the display 148. The webpage 400 additionally includes a fourth link 408 to a webpage discussing "John Doe" having a Basketball Team X tattoo. When the fourth link 408 is selected, the webpage discussing "John Doe" having a "Basketball Team X" tattoo is presented on the display 148.

Figure 5:
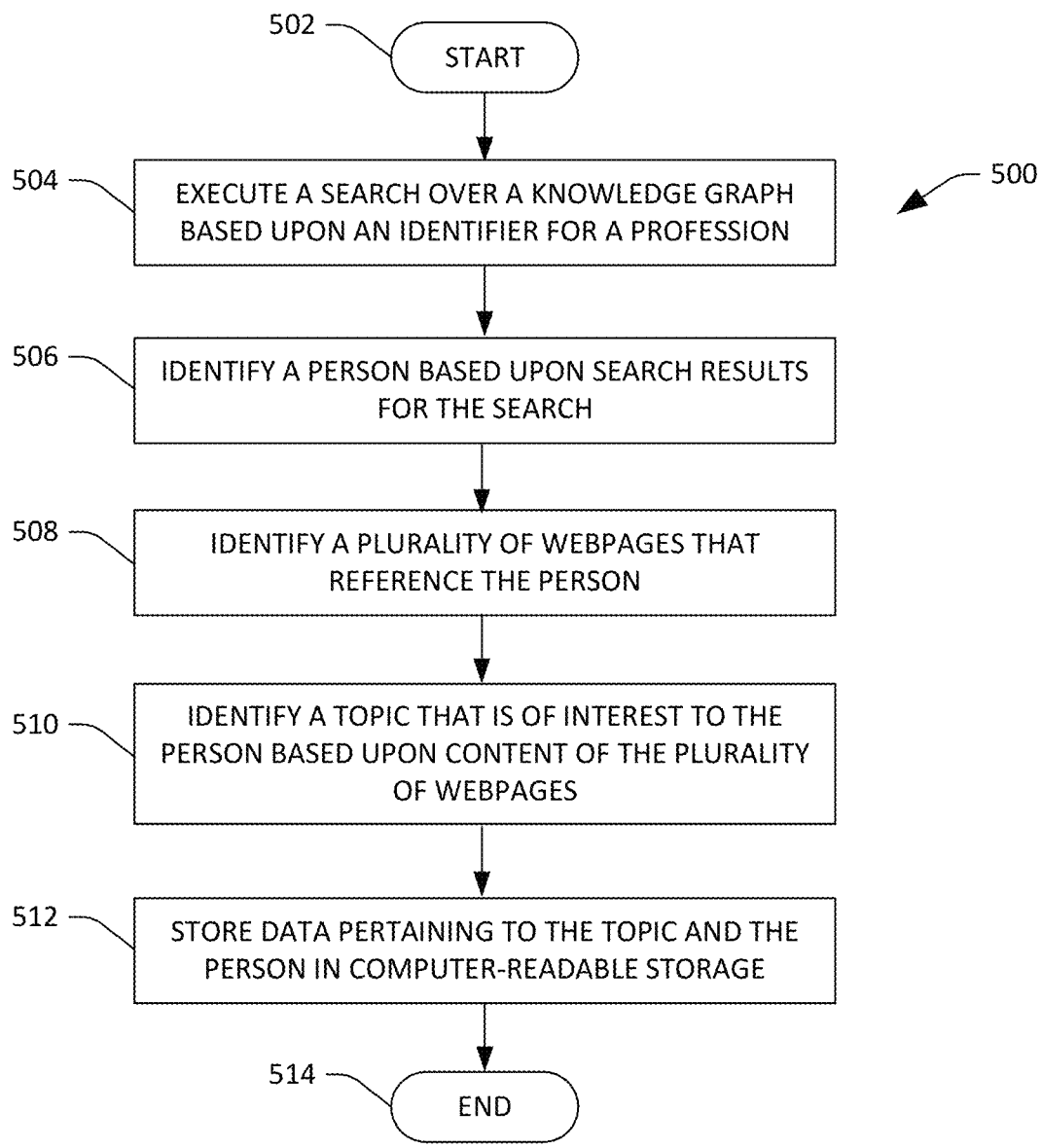
FIG. 5 is a flow diagram that illustrates an example methodology executed by a computing system that facilitates determining a topic that is of interest to a person.
Figure 6:
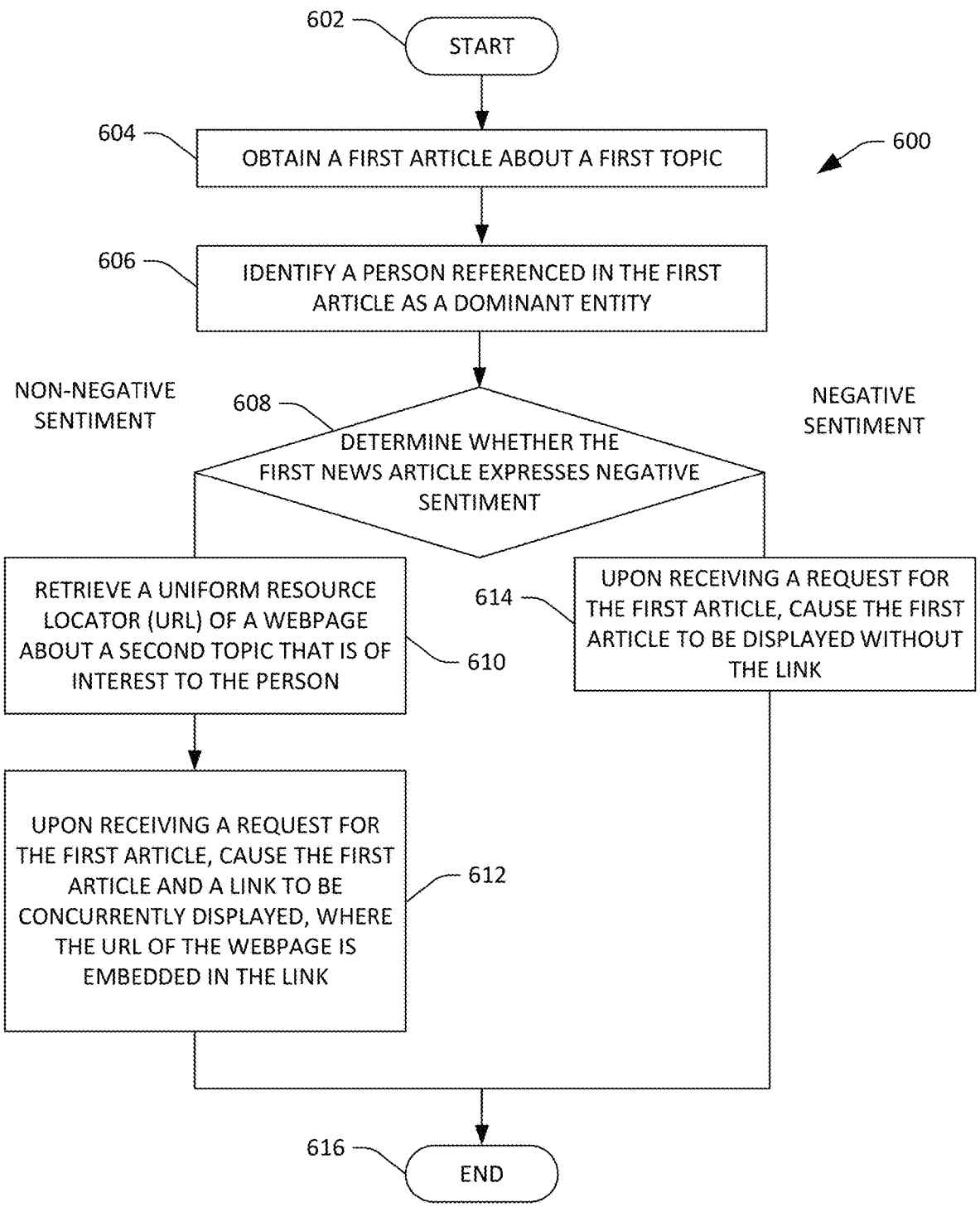
FIG. 6 is a flow diagram that illustrates an example methodology executed by a computing system that facilitates displaying information pertaining to a topic that is of interest to a person.

FIGS. 5 and 6 illustrate example methodologies relating to identifying topics that are of interest to persons referenced in articles. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an example methodology 500 executed by a computing system that facilitates determining a topic that is of interest to a person is illustrated. The methodology 500 begins at 502, and at 504, the computing system executes a search over a knowledge graph based upon an identifier for a profession. At 506, the computing system identifies a person referenced in the knowledge graph based upon search results for the search, where the person belongs to the profession. At 508, the computing system identifies a plurality of webpages that reference the person. At 510, the computing system identifies a topic that is of interest to the person based upon content of the plurality of webpages. At 512, the computing system stores data pertaining to the topic and the person in computer-readable storage. The data includes a name of the person, a name of the topic that is of interest to the person, and a URL of a webpage that includes information about the topic. The methodology 500 concludes at 514.

Turning now to FIG. 6, an example methodology 600 executed by a computing system that facilitates displaying data pertaining to a topic that is of interest to a person is illustrated. The methodology 600 begins at 602, and at 604, the computing system obtains a first article, where the first article is about a first topic. The first article references a plurality of entities. The plurality of entities include a person. At 606, the computing system identifies the person referenced in the first article as a dominant entity of the first article based upon a number of references to the person within the first article. At 608, the computing system determines whether the first article expresses negative sentiment based upon content of the first article. At 610, in accordance with a determination that the first article does not express negative sentiment, the computing system retrieves a URL of a webpage that includes information pertaining to a second topic, where the second topic is of interest to the person. The second topic that is of interest to the person is determined based upon an entry for the person in a computer-implemented knowledge graph and a second article that references both the person and the second topic. At 612, upon receiving a request for the first article from a computing device, the computing system causes the first article and a link to be displayed on a display. The URL of the webpage is embedded in the link. The webpage is presented on the display upon the link being selected. At 614, in accordance with a determination that the first article expresses negative sentiment and upon receiving a request for the first article, the computing system causes the first article to be presented on a display (without presenting the link). The methodology 600 concludes at 616.

Figure 7:
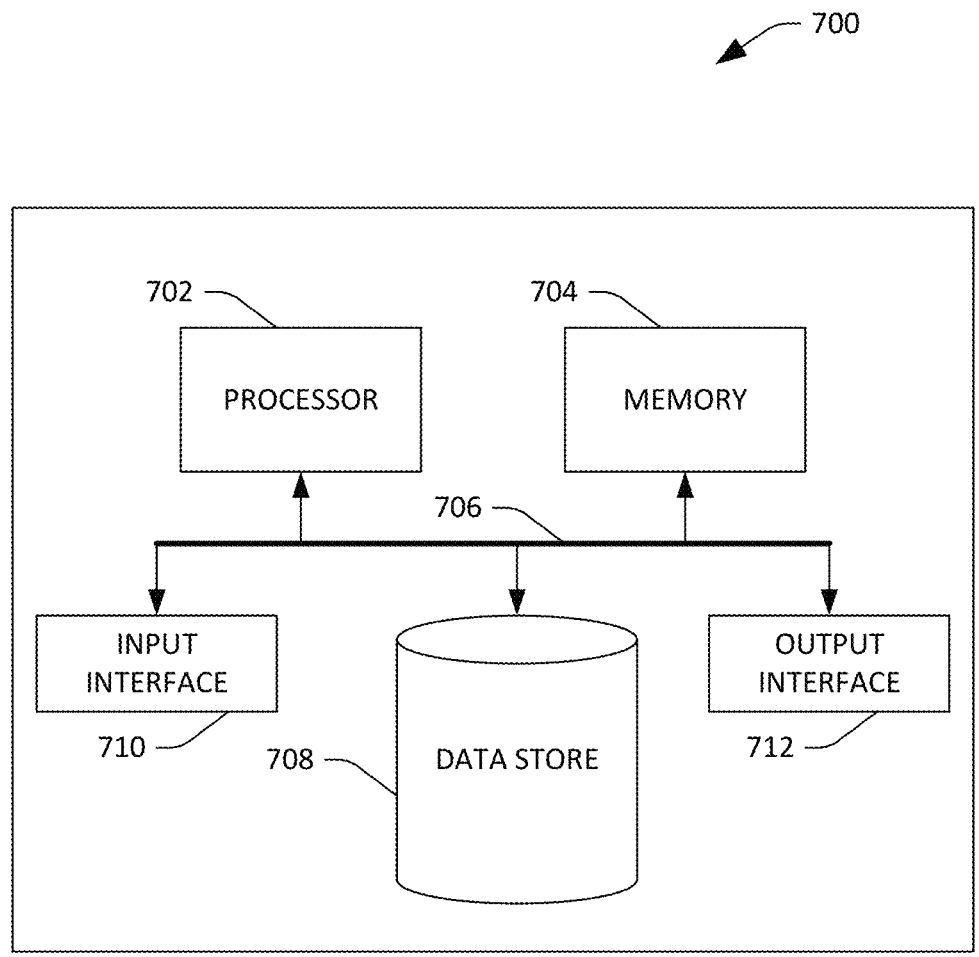
FIG. 7 is an example computing device.

Referring now to FIG. 7, a high-level illustration of an example computing device 700 that can be used in accordance with the systems and methodologies disclosed herein is illustrated. In an example, the computing device 700 may be used in a system that determines a topic that is of interest to a person referenced in a knowledge graph. By way of another example, the computing device 700 can be used in a system that displays data pertaining to a topic that is of interest to a person referenced in a knowledge graph. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store knowledge graphs, entity interest data, news articles, computer-implemented models (named entity recognition models, coreference resolution models, sentiment analysis model), etc.

The computing device 700 additionally includes a data store 708 that is accessible by the processor 702 by way of the system bus 706. The data store 708 may include executable instructions, knowledge graphs, entity interest data, news articles, computer-implemented models (named entity recognition models, coreference resolution models, sentiment analysis model), etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

The present disclosure relates to identifying a topic that is of interest to a person referenced in an article according to at least the following examples provided in the section below:

(A1) In one aspect, some embodiments include a method (e.g., 600) executed by a processor (e.g., 104) of a computing system (e.g., 102). The method includes obtaining (e.g., 604) a computer-readable first article (e.g., 126) about a first topic, where the first article references a plurality of entities, and further where the plurality of entities include a person (e.g., 152). The method further includes identifying (e.g., 606) the person as a dominant entity of the first article based upon a number of references to the person within the first article. The method additionally includes determining (e.g., 608) whether the first article expresses negative sentiment based upon content of the first article. The method also includes in accordance with a determination that the first article does not express negative sentiment: (a) retrieving (e.g., 610) a uniform resource locator (URL) of a webpage about a second topic that is of interest to the person, wherein the second topic is determined to be of interest to the person based upon an entry for the person in a computer-implemented knowledge graph (e.g., 110, 200) and a second article that references both the person and the second topic and (b) upon receiving a request for the first article from a computing device (e.g., 134), causing (e.g., 612) the first article and a link to be concurrently displayed on a display (e.g., 148), where the URL of the webpage is embedded in the link. The method further includes in accordance with a determination that the first article expresses negative sentiment: upon receiving the request for the first article from the computing device, causing (e.g., 614) the first article to be displayed on the display without concurrently displaying the link.

(A2) In some embodiments of the method of A1, the method further includes prior to obtaining the first article, executing a search over the knowledge graph based upon an identifier for a profession. The method additionally includes responsive to executing the search, identifying a plurality of persons referenced in the knowledge graph based upon search results for the search, where each person in the plurality of persons belongs to the profession, and further where the plurality of persons includes the person. The method also includes obtaining names of each person in the plurality of persons from entries for each person in the knowledge graph.

(A3) In some embodiments of the method of A2, the method further includes subsequent to obtaining the names of each person in the plurality of persons, identifying a plurality of articles that reference the person based upon a name of the person, where the plurality of articles include the second article that references both the person and the second topic. The method also includes providing content of the second article as input to a computer-implemented named-entity recognition model (e.g., 116), where the named-entity recognition model outputs an indication that the second topic referenced in the second article is of interest to the person based upon the content of the second article. The method further includes storing entity interest data (e.g., 132) in computer-readable storage, wherein the entity interest data indicates that the second topic is of interest to the person.

(A4) In some embodiments of the method of A3, the named-entity recognition model is a deep learning model.

(A5) In some embodiments of any of the methods of A1-A4, a third topic is of interest to the person. The method further includes ranking the second topic and the third topic based upon ranking criteria. The method additionally includes selecting the second topic based upon a rank of the second topic and a rank of the third topic, where the link is displayed on the display concurrently with the first article based upon the second topic being selected.

(A6) In some embodiments of any of the methods of A1-A5, the article is presented within a first region (e.g., 302) of a graphical user interface (GUI) (e.g., 300, 150) and the link is presented within a second region (e.g., 304) of the GUI.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes obtaining a computer-readable first article (e.g., 126) about a first topic, where the first article references a plurality of entities, and further where the plurality of entities include a first person (e.g., 152). The method further includes identifying the first person as a dominant entity of the first article based upon a number of references to the first person within the first article. The method additionally includes determining whether the first article expresses negative sentiment based upon content of the first article. The method also includes in accordance with a determination that the first article does not express negative sentiment, retrieving a uniform resource locator (URL) of a webpage about a second topic that is of interest to the first person, where the second topic is determined to be of interest to the first person based upon an entry for the first person in a computer-implemented knowledge graph (e.g., 110, 200) and a second article that references both the first person and the second topic. The method further includes upon receiving a request for the first article from a computing device (e.g., 134), causing the first article and a link to be concurrently displayed on a display (e.g., 148), where the URL of the webpage is embedded in the link.

(D2) In some embodiments of the method of D1, the method further includes prior to obtaining the first article, executing a search over the knowledge graph based upon an identifier for a profession. The method additionally includes responsive to executing the search, identifying a plurality of persons referenced in the knowledge graph, where each person in the plurality of persons belongs to the profession, and further where the plurality of persons includes the first person. The method also includes for each person in the plurality of persons, obtaining a name of the person from an entry for the person in the knowledge graph.

(D3) In some embodiments of the method of D2, the profession is one or more of an actor, a politician, a social media influencer, or an athlete.

(D4) In some embodiments of any of the methods of D2-D3, the method further includes subsequent to obtaining a name of the first person, identifying a plurality of articles that reference the first person based upon the name of the first person, where the plurality of articles include the second article. The method additionally includes providing content of the second article as input to a computer-implemented named-entity recognition model (e.g., 116), where the named-entity recognition model outputs an indication that the second topic referenced in the second article is of interest to the first person based upon the content of the second article.

(D5) In some embodiments of any of the methods of D2-D4, the method further includes subsequent to obtaining the first article, determining that the first person is included in the plurality of persons based upon a name of the first person, where the first article and the link are caused to be concurrently displayed in accordance with the first person being included in the plurality of persons.

(D6) In some embodiments of the method of D4, the method further includes subsequent to identifying that the second topic is of interest to the first person, obtaining the URL of the webpage that includes the information pertaining to the second topic. The method also includes storing the URL of the webpage in a data store (e.g., 108).

(D7) In some embodiments of any of the methods of D1-D6, the method further includes obtaining a name of the first person from the first article. The method additionally includes executing a search over the knowledge graph based upon the name of the first person. The method also includes identifying a profession of the first person from the knowledge graph. The method additionally includes determining that the profession of the first person is included in a plurality of professions, where the first article and the link are caused to be concurrently displayed in accordance with the profession of the first person being included in the plurality of professions.

(D8) In some embodiments of any of the methods of D1-D7, causing the first article and the link to be concurrently displayed on the display includes inserting the link into the first article and transmitting the first article with the link inserted therein to the computing device, where the first article and the link are presented concurrently on the display by the computing device.

(D9) In some embodiments of any of the methods of D1-D8, the second topic relates to one or more of an athlete, a sports team, a sports league, a sports event, an entertainment event, a performer, an actor, a television show, a director, or a politician.

(D10) In some embodiments of any of the methods of D1-D9, the plurality of entities referenced in the first article further include a first entity and the first person is determined to be the dominant entity of the first article in accordance with the number of references to the first person within the first article exceeding a number of references to the first entity within the first article.

(D11) In some embodiments of any of the methods of D1-D10, the references to the first person within the first article include one or more of a full name of the first person, a first name of the first person, a last name of the first person, a subject pronoun referring to the first person, an object pronoun referring to the first person, a possessive adjective referring to the first person, a possessive pronoun referring to the first person, or a reflexive pronoun referring to the first person.

(E1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of D1-D11).

(F1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of D1-D11).

(G1) In another aspect, some embodiments include a method performed by a computing system (e.g., 102) that includes a processor (e.g., 104). The method includes obtaining a computer-readable article (e.g., 126) about a first topic, wherein the first article references a plurality of entities, and further wherein the plurality of entities include a first person (e.g., 152). The method further includes identifying the first person referenced in the first article as a dominant entity of the first article based upon a number of references to the first person within the first article. The method additionally includes determining whether the first article expresses non-negative sentiment based upon content of the first article. The method also includes when the first article is determined to express non-negative sentiment, retrieving a uniform resource locator (URL) of a webpage about a second topic that is of interest to the first person, wherein the second topic is determined to be of interest to the first person based upon an entry for the first person in a computer-implemented knowledge graph (e.g., 110, 200) and a second article that references both the first person and the second topic. The method further includes upon receiving a request for the article from a computing device (e.g., 134), transmitting the article and a link to the computing device for concurrent presentment on a display (e.g., 148), where the URL of the webpage is embedded in the link.

(G2) In some embodiments of the method of G1, the link is displayed on the display as a question, wherein the question includes a name of the first person and a name of the second topic that is of interest to the first person.

(G3) In some embodiments of any of the methods G1-G2, the webpage includes URLs for webpages and each webpage in the webpages references both the first person and the second topic.

(H1) In another aspect, some embodiments include a computing system (e.g., 102) including a processor (e.g., 104) and memory (e.g., 106). The memory stores instructions that, when executed by the processor, cause the processor to perform any of the methods described herein (e.g., any of G1-G3).

(I1) In yet another aspect, some embodiments include a non-transitory computer-readable storage medium that includes instructions that, when executed by a processor (e.g., 104) of a computing system (e.g., 102), cause the processor to perform any of the methods described herein (e.g., any of G1-G3).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
 a processor; and
 memory storing instructions that, when executed by the processor, cause the processor to perform acts comprising:
  obtaining a computer-readable first article about a first topic, wherein the first article references a plurality of entities, and further wherein the plurality of entities include a first person;
  identifying the first person as a dominant entity of the first article based upon a number of references to the first person within the first article;
  determining whether the first article expresses negative sentiment based upon content of the first article;
  in accordance with a determination that the first article does not express negative sentiment, retrieving a uniform resource locator (URL) of a webpage about a second topic that is of interest to the first person, wherein the second topic is determined to be of interest to the first person based upon an entry for the first person in a computer-implemented knowledge graph and a second article that references both the first person and the second topic; and upon receiving a request for the first article from a computing device, causing the first article and a link to be concurrently displayed on a display, wherein the URL of the webpage is embedded in the link.

2. The computing system of claim 1, the acts further comprising:

prior to obtaining the first article, executing a search over the knowledge graph based upon an identifier for a profession;

responsive to executing the search, identifying a plurality of persons referenced in the knowledge graph, wherein each person in the plurality of persons belongs to the profession, and further wherein the plurality of persons includes the first person; and for each person in the plurality of persons, obtaining a name of the person from an entry for the person in the knowledge graph.

3. The computing system of claim 2, wherein the profession is one or more of:
a actor;
a politician;
a social media influencer; or
an athlete.

4. The computing system of claim 2, the acts further comprising:

subsequent to obtaining a name of the first person, identifying a plurality of articles that reference the first person based upon the name of the first person, wherein the plurality of articles include the second article; and providing content of the second article as input to a computer-implemented named-entity recognition model, wherein the named-entity recognition model outputs an indication that the second topic referenced in the second article is of interest to the first person based upon the content of the second article.

5. The computing system of claim 2, the acts further comprising:

subsequent to obtaining the first article, determining that the first person is included in the plurality of persons based upon a name of the first person; and wherein the first article and the link are caused to be concurrently displayed in accordance with the first person being included in the plurality of persons.

6. The computing system of claim 4, the acts further comprising:

subsequent to identifying that the second topic is of interest to the first person, obtaining the URL of the webpage that includes the information pertaining to the second topic; and storing the URL of the webpage in a data store.

7. The computing system of claim 1, the acts further comprising:

obtaining a name of the first person from the first article;
executing a search over the knowledge graph based upon the name of the first person;
identifying a profession of the first person from the knowledge graph; and
determining that the profession of the first person is included in a plurality of professions, wherein the first article and the link are caused to be concurrently displayed in accordance with the profession of the first person being included in the plurality of professions.

8. The computing system of claim 1, wherein causing the first article and the link to be concurrently displayed on the display comprises:

inserting the link into the first article; and
transmitting the first article with the link inserted therein to the computing device, wherein the first article and the link are presented concurrently on the display by the computing device.

9. The computing system of claim 1, wherein the second topic relates to one or more of:
an athlete;
a sports team;
a sports league;
a sports event;
an entertainment event;
a performer;
an actor;
a television show;
a director; or
a politician.

10. The computing system of claim 1, wherein the plurality of entities referenced in the first article further include a first entity, wherein the first person is determined to be the dominant entity of the first article in accordance with the number of references to the first person within the first article exceeding a number of references to the first entity within the first article.

11. The computing system of claim 1, wherein the references to the first person within the first article include one or more of:
a full name of the first person;
a first name of the first person;
a last name of the first person;
a subject pronoun referring to the first person;
an object pronoun referring to the first person;
a possessive adjective referring to the first person;
a possessive pronoun referring to the first person; or
a reflexive pronoun referring to the first person.

12. A method executed by a processor of a computing system, the method comprising:

obtaining a computer-readable first article about a first topic, wherein the first article references a plurality of entities, and further wherein the plurality of entities include a person;

identifying the person as a dominant entity of the first article based upon a number of references to the person within the first article;

determining whether the first article expresses negative sentiment based upon content of the first article;

in accordance with a determination that the first article does not express negative sentiment:

retrieving a uniform resource locator (URL) of a webpage about a second topic that is of interest to the person, wherein the second topic is determined to be of interest to the person based upon an entry for the person in a computer-implemented knowledge graph and a second article that references both the person and the second topic; and upon receiving a request for the first article from a computing device, causing the first article and a link to be concurrently displayed on a display, wherein the URL of the webpage is embedded in the link; and in accordance with a determination that the first article expresses negative sentiment:

upon receiving the request for the first article from the computing device, causing the first article to be displayed on the display without concurrently displaying the link.

13. The method of claim 12, further comprising:
prior to obtaining the first article, executing a search over the knowledge graph based upon an identifier for a profession;
responsive to executing the search, identifying a plurality of persons referenced in the knowledge graph based upon search results for the search, wherein each person in the plurality of persons belongs to the profession, and further wherein the plurality of persons includes the person; and
obtaining names of each person in the plurality of persons from entries for each person in the knowledge graph.

14. The method of claim 13, further comprising:
subsequent to obtaining the names of each person in the plurality of persons, identifying a plurality of articles that reference the person based upon a name of the person, wherein the plurality of articles include the second article that references both the person and the second topic;
providing content of the second article as input to a computer-implemented named-entity recognition model, wherein the named-entity recognition model outputs an indication that the second topic referenced in the second article is of interest to the person based upon the content of the second article; and
storing entity interest data in computer-readable storage, wherein the entity interest data indicates that the second topic is of interest to the person.

15. The method of claim 14, wherein the named-entity recognition model is a deep learning model.

16. The method of claim 12, wherein a third topic is of interest to the person, the method further comprising:
ranking the second topic and the third topic based upon ranking criteria; and
selecting the second topic based upon a rank of the second topic and a rank of the third topic, wherein the link is displayed on the display concurrently with the first article based upon the second topic being selected.

17. The method of claim 12, wherein the article is presented within a first region of a graphical user interface (GUI), wherein the link is presented within a second region of the GUI.

18. A non-transitory computer-readable storage medium comprising instructions that, when executed by a processor of a computing system, cause the processor to perform acts comprising:
obtaining a computer-readable first article about a first topic, wherein the first article references a plurality of entities, and further wherein the plurality of entities include a first person;
identifying the first person referenced in the first article as a dominant entity of the first article based upon a number of references to the first person within the first article;
determining whether the first article expresses non-negative sentiment based upon content of the first article;
when the first article is determined to express non-negative sentiment, retrieving a uniform resource locator (URL) of a webpage about a second topic that is of interest to the first person, wherein the second topic is determined to be of interest to the first person based upon an entry for the first person in a computer-implemented knowledge graph and a second article that references both the first person and the second topic; and
upon receiving a request for the first article from a computing device, transmitting the first article and a link to the computing device for concurrent presentment on a display, wherein the URL of the webpage is embedded in the link.

19. The non-transitory computer-readable storage medium of claim 18, wherein the link is displayed on the display as a question, wherein the question includes a name of the first person and a name of the second topic that is of interest to the first person.

20. The non-transitory computer-readable storage medium of claim 18, wherein the webpage includes URLs for webpages, wherein each webpage in the webpages references both the first person and the second topic.

* * * * *